US012800494B2

(12) United States Patent
Seo et al.

(10) Patent No.: US 12,800,494 B2
(45) Date of Patent: Nov. 17, 2026

(54) POLYMERASE CHAIN REACTION (PCR) DIAGNOSIS APPARATUS

(71) Applicant: Electronics and Telecommunications Research Institute, Daejeon (KR)

(72) Inventors: Hong-Seok Seo, Daejeon (KR); Dong Hoon Song, Daejeon (KR); Jeong Won Park, Daejeon (KR); Chul Huh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 902 days.

(21) Appl. No.: 18/115,382

(22) Filed: Feb. 28, 2023

(65) Prior Publication Data

US 2023/0408410 A1 Dec. 21, 2023

(30) Foreign Application Priority Data

Jun. 10, 2022 (KR) ........................ 10-2022-0071015

(51) Int. Cl.

*G01N 21/64* (2006.01)
*C12Q 1/686* (2018.01)
*H04J 13/00* (2011.01)

(52) U.S. Cl.

CPC . *G01N 21/6428* (2013.01); *G01N 2021/6439* (2013.01); *G01N 2201/0612* (2013.01); *G01N 2201/0697* (2013.01); *G01N 2201/08* (2013.01)

(58) Field of Classification Search

None

See application file for complete search history.

(56) References Cited

U.S. PATENT DOCUMENTS

| | | | |
|---|---|---|---|
| 6,781,734 | B2 | 8/2004 | Vail et al. |
| 8,137,616 | B2 | 3/2012 | Sagner et al. |
| 8,456,629 | B2 | 6/2013 | Jalali et al. |

(Continued)

FOREIGN PATENT DOCUMENTS

| | | | |
|---|---|---|---|
| JP | 2010078559 A | * | 4/2010 |
| JP | 2012-18122 | | 1/2012 |

(Continued)

OTHER PUBLICATIONS

Gueutue et al., "Nanosecond time-resolved Raman spectroscopy for solving some Raman problems such as uminescence or thermal emission", Journal of Raman Spectroscopy, Jan. 16, 2018, pp. 822-829.

*Primary Examiner* — Neil N Turk

(74) *Attorney, Agent, or Firm* — KILE PARK REED & HOUTTEMAN PLLC

(57) ABSTRACT

Disclosed is a PCR diagnosis apparatus. This apparatus includes a PCR chip configured to store a PCR sample, a light source part configured to generate laser light to be provided to the PCR sample, an optical modulator provided between the light source part and the PCR chip and configured to selectively provide the laser light to the PCR sample according to a code, a sensor configured to detect fluorescent light generated in the PCR sample by the laser light, and a code generator connected between the optical modulator and the sensor and configured to transmit an orthogonal code to the optical modulator and the sensor.

8 Claims, 8 Drawing Sheets

(56) References Cited

U.S. PATENT DOCUMENTS

| | | | | |
|---|---|---|---|---|
| 9,503,624 | B2 | 11/2016 | Jeong et al. | |
| 10,048,208 | B2 | 8/2018 | Rothberg et al. | |
| 10,345,243 | B2 | 7/2019 | Lee et al. | |
| 11,747,281 | B2 | 9/2023 | Lee et al. | |
| 2013/0101983 | A1* | 4/2013 | Chandra | C12Q 1/686 435/286.1 |
| 2013/0161533 | A1 | 6/2013 | Shin et al. | |
| 2020/0011734 | A1* | 1/2020 | Lee | G01J 3/18 |
| 2020/0281477 | A1 | 9/2020 | Islam | |
| 2020/0412081 | A1* | 12/2020 | Muendel | H01S 3/1118 |
| 2022/0064702 | A1* | 3/2022 | Seo | G01N 21/6408 |

FOREIGN PATENT DOCUMENTS

| | | |
|---|---|---|
| JP | 2013-511718 | 4/2013 |
| JP | 2016-537998 | 12/2016 |
| KR | 10-2018-0123867 | 11/2018 |
| KR | 10-2021-0051049 | 5/2021 |

* cited by examiner

FIG. 3

| Orthogonal Code | Reversed-Orthogonal Code |
|---|---|
| ~~[00000000]~~ | ~~[11111111]~~ |
| [01010101] | [10101010] |
| [00110011] | [11001100] |
| [01100110] | [10011001] |
| [00001111] | [11110000] |
| [01011010] | [10100101] |
| [00111100] | [11000011] |
| [01101001] | [10010110] |

FIG. 4

| Orthogonal Code | Reversed-Orthogonal Code |
|---|---|
| ~~[0000000000000000]~~ | ~~[1111111111111111]~~ |
| [0101010101010101] | [1010101010101010] |
| [0011001100110011] | [1100110011001100] |
| [0110011001100110] | [1001100110011001] |
| [0000111100001111] | [1111000011110000] |
| [0101101001011010] | [1010010110100101] |
| [0011110000111100] | [1100001111000011] |
| [0110100101101001] | [1001011010010110] |
| [0000000011111111] | [1111111100000000] |
| [0101010110101010] | [1010101001010101] |
| [0011001111001100] | [1100110000110011] |
| [0110011010011001] | [1001100101100110] |
| [0000111111110000] | [1111000000001111] |
| [0101101010100101] | [1010010101011010] |
| [0011110011000011] | [1100001100111100] |
| [0110100110010110] | [1001011001101001] |

POLYMERASE CHAIN REACTION (PCR) DIAGNOSIS APPARATUS

CROSS-REFERENCE TO RELATED APPLICATIONS

This U.S. non-provisional patent application claims priority under 35 U.S.C. § 119 of Korean Patent Application No. 10-2022-0071015, filed on Jun. 10, 2022, the entire contents of which are hereby incorporated by reference.

BACKGROUND

The present disclosure herein relates to a diagnosis apparatus, and more particularly, to a polymerase chain reaction (PCR) diagnosis apparatus.

Recently, it has been required to develop a molecular diagnostic technology for simultaneously measuring various virus molecules. The molecular diagnostic technology may belong to the field of extraction of nucleic acids (DNA, RNA) through pre-processing of a biospecimen to be measured and the field of cloning and amplifying a particular DNA or RNA fragment through polymerase chain reaction (PCR) after the pre-processing. Furthermore, the molecular diagnostic technology may also belong to the field of measuring the strength of a fluorescent signal emitted from fluorescent light through an optical method after fluorescently labeling an amplified DNA.

SUMMARY

The present disclosure provides a PCR diagnosis apparatus capable of reducing noise in fluorescent light.

Provided is a PCR diagnosis apparatus. This apparatus includes a PCR chip configured to store a PCR sample; a light source part configured to generate laser light to be provided to the PCR sample; an optical modulator provided between the light source part and the PCR chip and configured to selectively provide the laser light to the PCR sample according to a code; a sensor configured to detect fluorescent light generated in the PCR sample by the laser light; and a code generator connected between the optical modulator and the sensor and configured to transmit an orthogonal code to the optical modulator and the sensor.

According to an example, the light source part may include: a first laser light source configured to generate first laser light; and a second laser light source connected to the first laser light source and configured to generate second laser light having a longer wavelength than a wavelength of the first laser light.

According to an example, the first laser light source may include: a first optical fiber; a semiconductor saturable absorber mirror connected to one side of the first optical fiber; a volume Bragg grating provided to another side of the first optical fiber; and a first pump light source connected to the first optical fiber between the volume Bragg grating and the semiconductor saturable absorber mirror and configured to provide first pump light in the first optical fiber.

According to an example, the second laser light source may include: a second optical fiber branched from the first optical fiber; and a second pump light source configured to provide second pump light in the second optical fiber to generate the second laser light.

According to an example, the second laser light source may further include: a first nonlinear optical fiber connected to the second optical fiber and configured to disperse the first laser light; and a first wavelength tunable filter configured to tune the wavelength of the first laser light.

According to an example, the light source part may further include a third laser light source connected to the first laser light source and configured to generate third laser light having a shorter wavelength than the wavelength of the first laser light.

According to an example, the third laser light source may include: a third optical fiber branched from the first optical fiber; and a third pump light source configured to provide third pump light in the third optical fiber to generate the third laser light.

According to an example, the third laser light source may further include: a second nonlinear optical fiber connected to the third optical fiber and configured to disperse the first laser light; and a second wavelength tunable filter configured to tune the wavelength of the first laser light.

According to an example, the first nonlinear optical fiber may include a first core having a first diameter, and the second nonlinear optical fiber may include a second core having a second diameter smaller than the first diameter.

According to an example, the optical modulator may include a digital mirror device, a liquid crystal display device, or a spatial optical modulator.

A PCR diagnosis apparatus according to an example of the inventive concept includes: a first laser light source configured to generate first laser light using first pump light; a second laser light source configured to generate second laser light having a longer wavelength than a wavelength of the first laser light using second pump light having a longer wavelength than a wavelength of the first pump light; a third laser light source configured to generate third laser light having a shorter wavelength than the wavelength of the first laser light using third pump light having a shorter wavelength than the wavelength of the first pump light; a PCR chip configured to store a sample generating fluorescent light by receiving the first to third laser light; an optical modulator provided between the PCR chip and the first to third laser light sources and configured to provide the first to third laser light to the sample; a sensor provided on one side of the PCR chip opposing the optical modulator and configured to detect the fluorescent light; and code control parts connected to the sensor and the optical modulator and configured to switch the first to third laser light respectively using an orthogonal code.

According to an example, the first laser light source may include: a first optical fiber; a semiconductor saturable absorber mirror provided to one side of the first optical fiber; a volume Bragg grating provided to another side of the first optical fiber; and a first pump light source connected to the first optical fiber between the volume Bragg grating and the semiconductor saturable absorber mirror and configured to provide the first pump light in the first optical fiber.

According to an example, the second laser light source may include: a second optical fiber branched from the first optical fiber; a second pump light source configured to provide the second pump light in the second optical fiber; and a first nonlinear optical fiber connected to the second optical fiber and configured to disperse the first laser light.

According to an example, the third laser light source may include: a third optical fiber branched from the first optical fiber; a third pump light source configured to provide the third pump light in the third optical fiber; and a second nonlinear optical fiber connected to the third optical fiber and configured to disperse the first laser light.

According to an example, the second laser light source may further include a first wavelength tunable filter arranged between the first nonlinear optical fiber and the second pump light source and configured to tune the wavelength of the first laser light, and the third laser light source may further include a second wavelength tunable filter arranged between the second nonlinear optical fiber and the third pump light source and configured to tune the wavelength of the first laser light.

A PCR diagnosis apparatus according to an example of the inventive concept includes: a first laser light source configured to generate first laser light; a second laser light source configured to generate second laser light having a longer wavelength than a wavelength of the first laser light and including a first nonlinear optical fiber dispersing the first laser light; a third laser light source configured to generate third laser light having a shorter wavelength than the wavelength of the second laser light and including a second nonlinear optical fiber dispersing the first laser light; a PCR chip configured to store a sample generating fluorescent light by receiving the first to third laser light; an optical modulator provided between the PCR chip and the first to third laser light sources and configured to provide the first to third laser light to the sample; a sensor provided on one side of the PCR chip opposing the optical modulator and configured to detect the fluorescent light; and code control parts connected to the sensor and the optical modulator and configured to switch the first to third laser light respectively using an orthogonal code.

According to an example, the first nonlinear optical fiber may include: first cladding; and a first core arranged in the first cladding and having a first diameter.

According to an example, the second nonlinear optical fiber may include: second cladding that is the same as the first cladding; and a second core arranged in the second cladding and having a second diameter smaller than the first diameter.

According to an example, the second laser light source may further include a first wavelength tunable filter provided adjacent to the first nonlinear optical fiber and configured to tune the wavelength of the first laser light.

According to an example, the third laser light source may further include a second wavelength tunable filter provided adjacent to the second nonlinear optical fiber and configured to tune the wavelength of the first laser light.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings:

FIG. 3 is a chart illustrating an example of a Walsh code generated by the code generator of FIG. 1;

FIG. 4 is a chart illustrating an example of a Walsh code generated by the code generator of FIG. 1;

DETAILED DESCRIPTION

Figure 1:
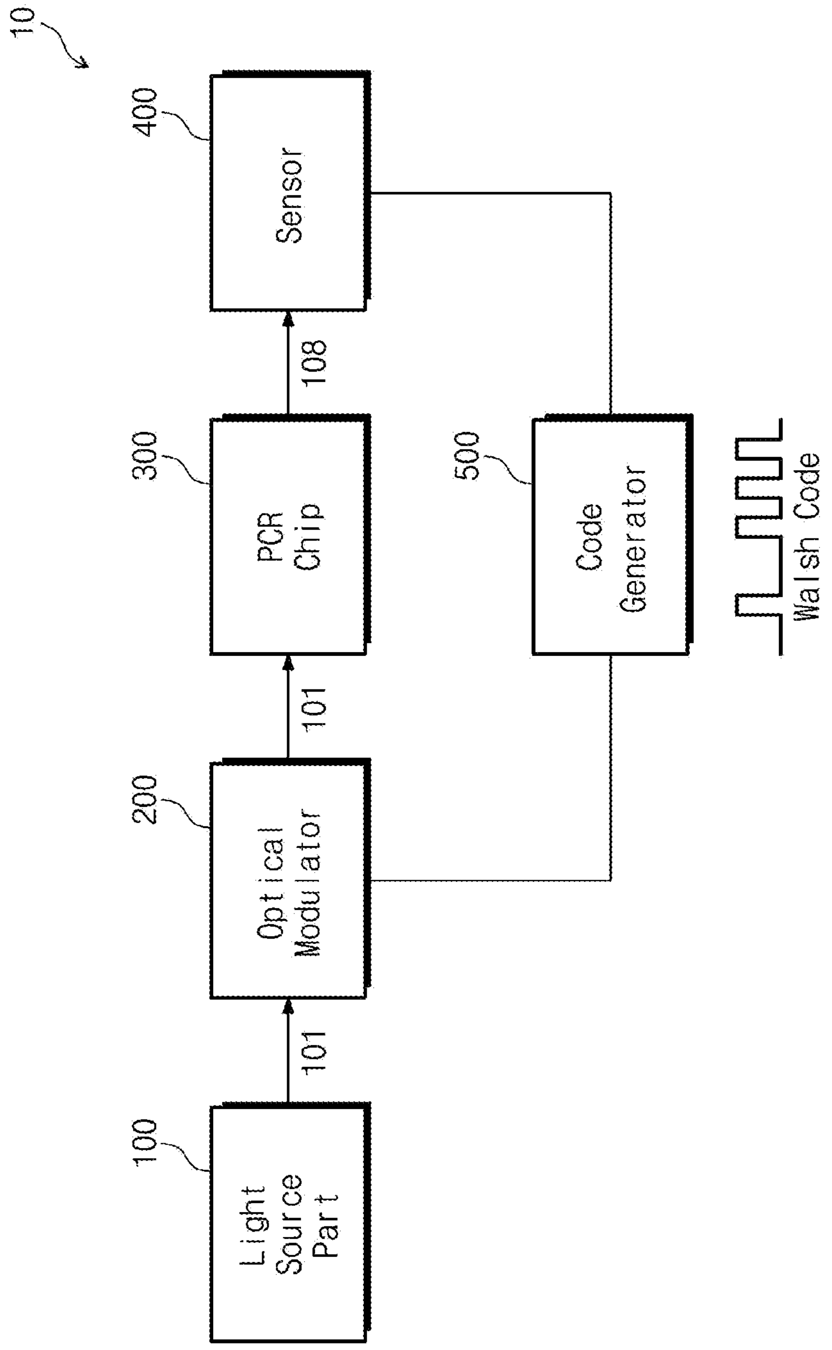
FIG. 1 is a block diagram illustrating an example of a PCR diagnosis apparatus according to the inventive concept.

Embodiments of the inventive concept will now be described in detail with reference to the accompanying drawings. The advantages and features of embodiments of the inventive concept, and methods for achieving the advantages and features will be apparent from the embodiments described in detail below with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the inventive concept to those skilled in the art, and the inventive concept is only defined by the scope of the claims. Like reference numerals refer to like elements throughout.

The terminology used herein is not for delimiting the embodiments of the inventive concept but for describing the embodiments of the inventive concept. The terms of a singular form may include plural forms unless otherwise specified. It will be further understood that the terms "includes", "including", "comprises", and/or "comprising", when used in this description, specify the presence of stated elements, steps, operations, and/or components, but do not preclude the presence or addition of one or more other elements, steps, operations, and/or components. Furthermore, in the present disclosure, the terms "laser", "code", and "two-photon" may be understood as optical, bio, and medical terms. Reference numerals, which are presented in the order of description, are provided according to the embodiments and are thus not necessarily limited to the order.

FIG. 1 illustrates an example of a PCR diagnosis apparatus 10 according to the inventive concept.

Referring to FIG. 1, the PCR diagnosis apparatus 10 of the inventive concept may include a light source part 100, an optical modulator 200, a PCR chip 300, a sensor 400, and a code generator 500. The light source part 100 may generate laser light 101. The light source part 100 may include a light emitting device (LED). The laser light 101 may include femtosecond laser light. The optical modulator 200 may temporally and/or spatially modulate the laser light 101 and provide the same to the PCR chip 300. The PCR chip 300 may store a sample 310. The sample 310 may receive the laser light 101 and may emit fluorescent light 108. The sensor 400 may detect the fluorescent light 108. The code generator 500 may provide an orthogonal code signal to the optical modulator 200 and the sensor 400 to remove and/or minimize noise in the fluorescent light 108. Each of the laser light 101 and the fluorescent light 108 may have inference noise reduced by the orthogonal code.

Figure 2:
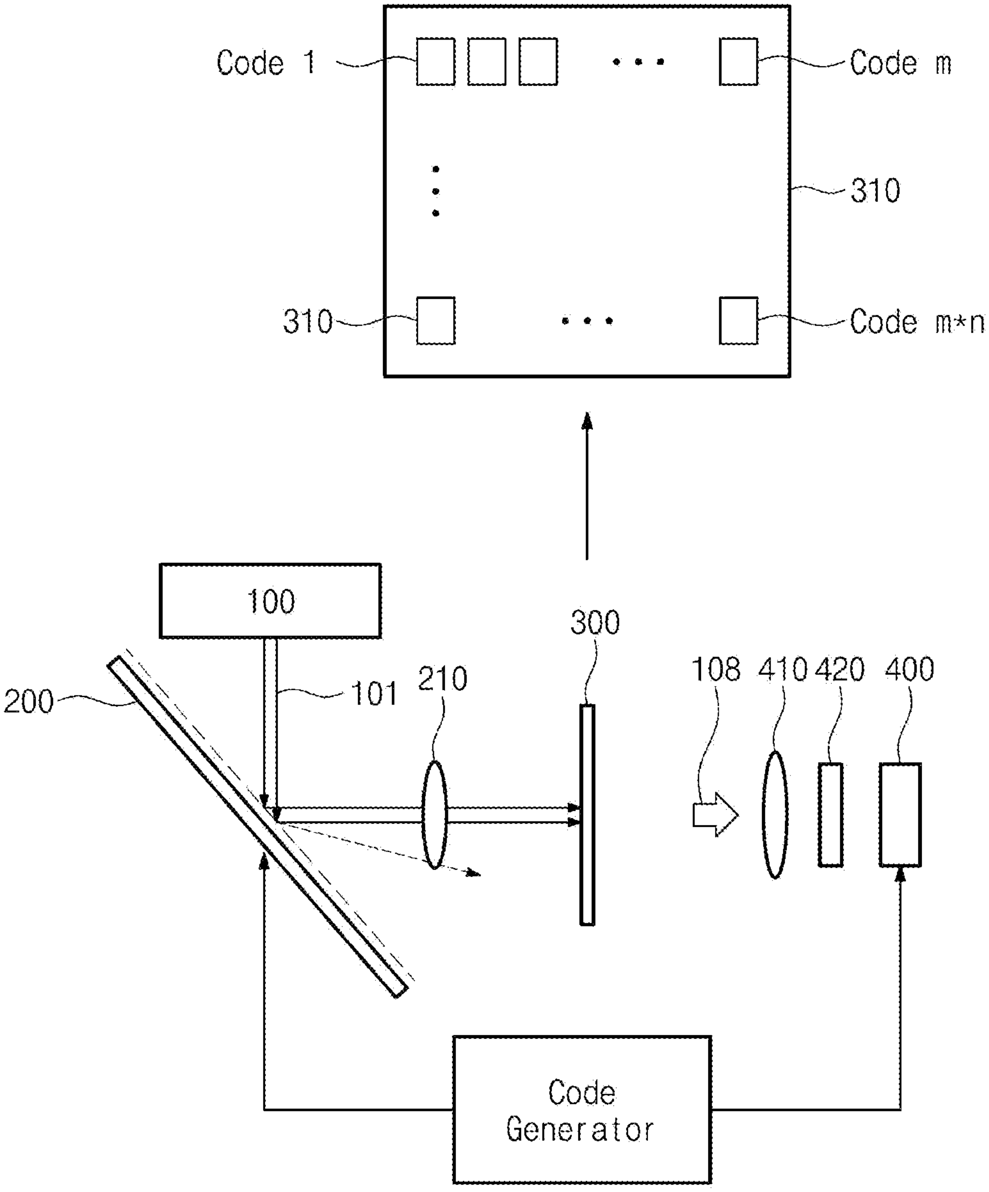
FIG. 2 is a diagram illustrating an example of the optical modulator, the PCR chip, and the sensor of FIG. 1.

FIG. 2 illustrates an example of the optical modulator 200, the PCR chip 300, and the sensor 400 of FIG. 1.

Referring to FIG. 2, the optical modulator 200 may include a digital mirror device. Alternatively, the optical modulator 200 may include a liquid crystal display (LCD) or a spatial light modulator, but an embodiment of the inventive concept is not limited thereto. The optical modulator 200 may selectively provide the laser light 101 to the PCR chip 300 based on the orthogonal code. Mirror cells 202 (FIG. 5) of the optical modulator 200 may switch the laser light 101 in response to a code of 1 or a code of 0. When a code of 1 is provided to the optical modulator 200, the laser light 101 may be provided to the PCR chip 300. When a code of 0 is provided to the optical modulator 200, the laser light 101 may not be provided to the PCR chip 300.

A first lens 210 may be provided between the optical modulator 200 and the PCR chip 300. The first lens 210 may provide the laser light 101 reflected from the optical modulator 200 to the PCR chip 300, and may relay the laser light 101 in an image form on the optical modulator 200.

The PCR chip 300 may store the sample 310 in a matrix form. The PCR chip 300 may store one to m×n number of samples 310. Each sample 310 may be delivered by the optical modulator 200 through the laser light 101 having one to m×n codes.

The sensor 400 may be provided on one side of the PCR chip 300 opposing the optical modulator 200. The sensor 400 may receive the fluorescent light 108 and may analyze a DNA in the sample 310 based on the orthogonal code.

A second lens 410 may be provided between the PCR chip 300 and the sensor 400. The second lens 410 may concentrate the fluorescent light 108 on the sensor 400. The second lens 410 may include a convex lens.

A filter 420 may be provided between the second lens 410 and the sensor 400. The filter 420 may remove the laser light 101 and may pass the fluorescent light 108. The filter 420 may include a color filter such as an acrylic or cellulose film, but an embodiment of the inventive concept is not limited thereto.

FIG. 3 illustrates an example of a Walsh code generated by the code generator 500 of FIG. 1.

Referring to FIG. 3, the code generator 500 may output, to the optical modulator 200 and the sensor 400, an 8-bit Walsh code with seven orthogonal codes except for a first code (code starting with 0 and ending with 0, or code starting with 1 and ending with 1). The codes of the 8-bit Walsh code may be orthogonal to each other. When −1 is allocated to 1 and 1 is allocated to 0 in each code, except for a reversed orthogonal code neighboring an orthogonal code, a result of an inner product between the codes is 0. For example, an inner product of a code of 0,1,0,1,0,1,0,1 and a code of 1,1,0,0,1,1,0,0 may be 0. When 0 is allocated to 1 and −1 is allocated to 0 in each code, a result of an inner product between the orthogonal codes is also 0.

FIG. 4 illustrates an example of a Walsh code generated by the code generator 500 of FIG. 1.

Referring to FIG. 4, the code generator 500 may output a 16-bit Walsh code to the optical modulator 200 and the sensor 400. 15 codes may be selected from the 16-bit code. Although not illustrated, 31 codes may be selected from a 32-bit code. As described above, the number of bits of a code may increase according to the number of the samples 310 in the PCR chip 300, and code division may be possible.

Figure 5:
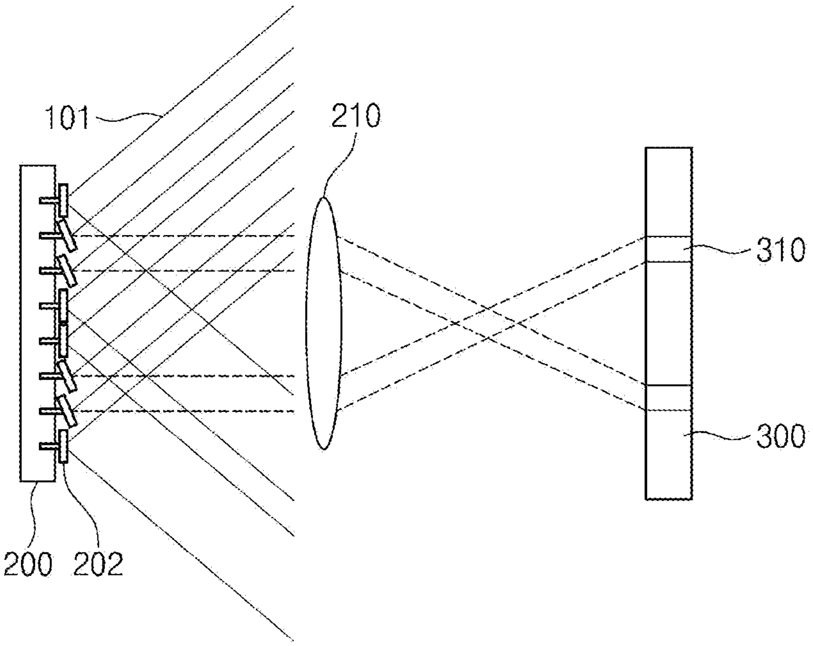
FIG. 5 is a diagram illustrating an example of the optical modulator of FIG. 1.

FIG. 5 illustrates an example of the optical modulator 200 of FIG. 1.

Referring to FIG. 5, the optical modulator 200 may have a plurality of mirror cells 202. The mirror cells 202 may individually reflect the laser light 101 to the samples 310 in the PCR chip 300. The mirror cells 202 may individually reflect the laser light 101 to the samples 310 in the PCR chip 300. The laser light 101 may be simultaneously provided towards the sample 310. The number of the mirror cells 202 may be about 1024×768. The first lens 210 may relay the laser light 101 in an image form.

Figure 6:
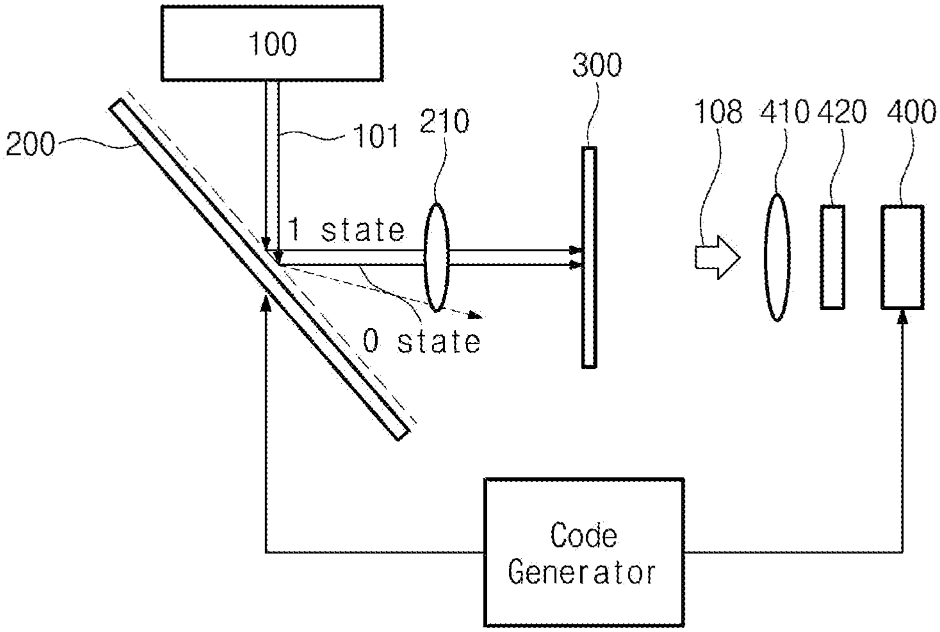
FIG. 6 is a diagram illustrating an example of the optical modulator of FIG. 1.

FIG. 6 illustrates an example of the optical modulator 200 of FIG. 1.

Referring to FIG. 6, the optical modulator 200 may sequentially provide the laser light 101 to the PCR chip 300. The laser light 101 may have a plurality of wavelengths. The laser light 101 having a plurality of different wavelengths may generate the fluorescent light 108 without interference.

The laser light 101 may be femtosecond laser light. When the sample 310 having a certain DNA sample absorbs at a wavelength of about 400 nm and the fluorescent light 108 exhibits a wavelength of about 450 nm, in the case of using a single-photon scheme, the laser light 101 of about 400 nm may be allowed to be incident, and the fluorescent light 108 of about 450 nm emitted from the sample 310 may be measured through the sensor 400. In this case, since the laser wavelength is close to the wavelength of the fluorescent light, it is required to appropriately select the laser removal filter 420. However, in the case of using a two-photon laser, the laser light 101 may have a wavelength of about 800 nm, and the fluorescent light 108 may have a wavelength of about 450 nm. The fluorescent light 108 based on a two-photon scheme may resolve filter issues by minimizing a difference between the wavelength of the laser light 101 and the wavelength of the fluorescent light 108, and may increase efficiency of PCR diagnosis.

The first lens 210, the second lens 410, the filter 420, and the sensor 400 may be configured in the same manner as illustrated in FIG. 2. The filter 420, which is a laser removal filter, differs for the two-photon scheme and the single-photon scheme.

Figure 7:
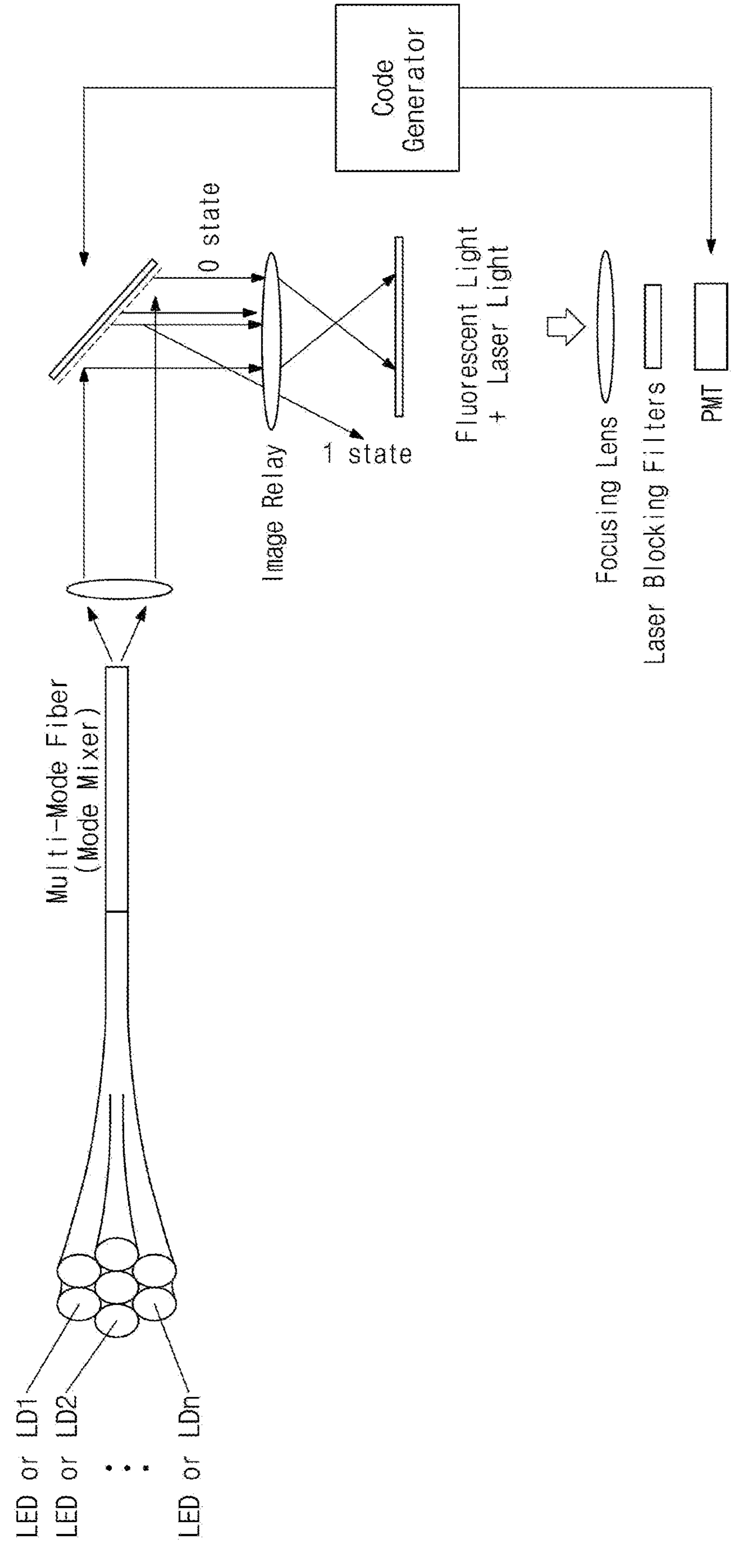
FIG. 7 is a diagram illustrating an example of a PCR diagnosis apparatus according to the inventive concept.

FIG. 7 illustrates an example of a PCR diagnosis apparatus 10 according to the inventive concept.

Referring to FIG. 7, the light source part 100 of the PCR diagnosis apparatus 10 may include a laser diode (LD) or light emitting diode (LED) having a plurality of different wavelengths. The LD or LED of the light source part 100 may operate in a pulse mode or a continuous mode. The laser light 101 is output to one optical fiber through an optical fiber coupler. The optical fiber coupler includes n number of input optical fibers and one output optical fiber. The input optical fibers may be single-mode or multi-mode optical fibers. The output optical fiber is a multi-mode optical fiber, and light input to the input optical fibers is propagated through the output optical fiber, and light of multiple modes is mixed and output from the output optical fiber. Output light is collimated through a lens and input to the optical modulator DMD. The optical modulator 200 turns on/off incident light according to an orthogonal code and relays the light to each cell of each PCR chip 300. An image formed on the optical modulator 200 is relayed to the PCR chip 300 through the lens 210 between the PCR chip 300 and the optical modulator 200. Fluorescent light (fluorescent light modulated by an orthogonal code) emitted from the PCR chip 300 and partially transmitted laser are concentrated through the lens 410, and the laser is removed by the filter 420 and only a fluorescent signal is incident on the sensor 400. The sensor 400 may receive, at one time, signals output from different cells, and a fluorescent value of each cell may be obtained through an inner product of orthogonal codes of a corresponding cell. In this process, a code gain is obtained since bits of 1 (allocated +1) in the orthogonal codes are added through the inner product, and noise is removed since bits of 0 (allocated −1) in the orthogonal codes are subtracted through the inner product.

Figure 8:
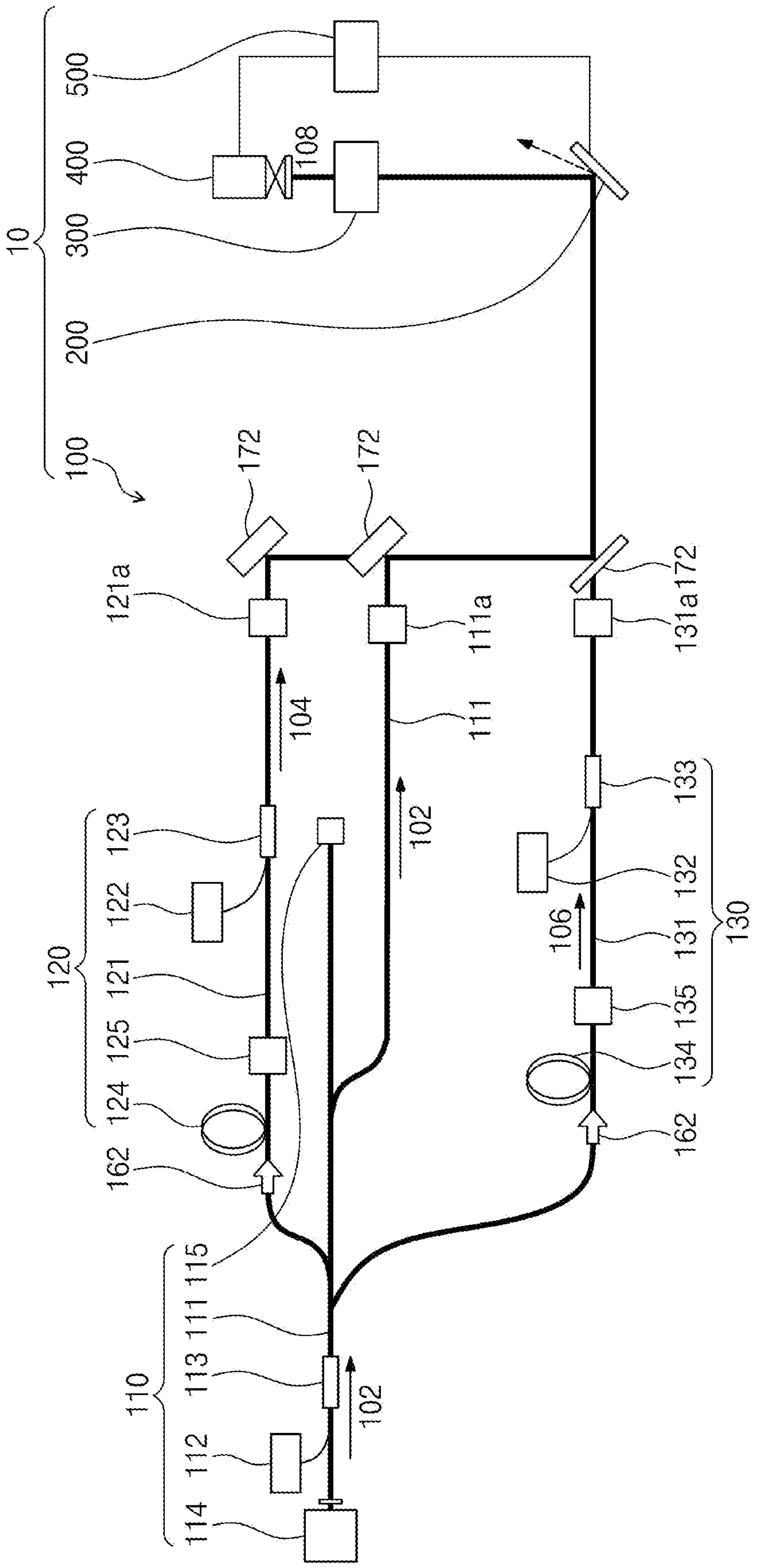
FIG. 8 is a diagram illustrating an example of a PCR diagnosis apparatus according to the inventive concept.

FIG. 8 illustrates an example of a PCR diagnosis apparatus 10 according to the inventive concept.

Referring to FIG. 8, the light source part 100 of the PCR diagnosis apparatus 10 of the inventive concept may include a first laser light source 110, a second laser light source 120, and a third laser light source 130.

The first laser light source 110 may be a reference laser light source. The first laser light source 110 may generate first laser light 102. The first laser light 102 may be reference light. According to an example, the first laser light source 110 may include a first optical fiber 111, a first pump light source 112, a first optical coupler 113, a volume Bragg grating 114, a semiconductor saturable absorber mirror 115.

The first optical fiber 111 may extend in one direction. The first optical fiber 111 may include a single-mode fiber. The first optical fiber 111 may include an optical fiber doped with a gain medium. Alternatively, the first optical fiber 111 may include a multi-mode optical fiber, but an embodiment of the inventive concept is not limited thereto.

The first pump light source 112 may provide first pump light to the first optical fiber 111 so as to oscillate the first laser light 102. The first pump light source 112 may include a light emitting diode. The first pump light may have a wavelength of about 976 nm.

The first optical coupler 113 may be connected to the first optical fiber 111. The first optical coupler 113 may connect the first pump light source 112 to the first optical fiber 111.

The volume Bragg grating 114 may be provided on one side end of the first optical fiber 111. The volume Bragg grating 114 may control a spectrum of the first laser light 102. A lens may be provided between the volume Bragg grating 114 and the first optical fiber 111. The lens may collimate the first laser light 102 on the volume Bragg grating 114.

The semiconductor saturable absorber mirror 115 may be connected to the other side of the first optical fiber 111. The semiconductor saturable absorber mirror 115 may reflect and/or resonate the first laser light 102. The semiconductor saturable absorber mirror 115 may pulse the first laser light 102. The first laser light 102 may be femto-second laser light generated by the semiconductor saturable absorber mirror 115.

The second laser light source 120 may be connected to the first laser light source 110. The second laser light source 120 may receive the first laser light 102 and generate second laser light 104. The second laser light 104 may have a longer wavelength than a wavelength of the first laser light 102. According to an example, the second laser light source 120 may include a second optical fiber 121, a second pump light source 122, a second optical coupler 123, a first nonlinear optical fiber 124, and a first wavelength tunable filter 125.

The second optical fiber 121 may be branched from the first optical fiber 111. The second optical fiber 121 may include an optical fiber doped with a gain medium.

The second pump light source 122 may be connected to the second optical fiber 121. The second pump light source 122 may provide second pump light in the second optical fiber 121 so as to obtain a gain of the second laser light 104. The second pump light may have a wavelength of about 980 nm.

The second optical coupler 123 may be connected to the second optical fiber 121. The second optical coupler 123 may connect the second pump light source 122 to the second optical fiber 121.

The first nonlinear optical fiber 124 may be connected to the second optical fiber 121 between the first optical fiber 111 and the second optical coupler 123. The first nonlinear optical fiber 124 may wavelength disperse the first laser light 102 and generate the second laser light 104. The second laser light 104 may have a longer wavelength than a wavelength of the first laser light 102.

An isolator 162 may be provided between the first nonlinear optical fiber 124 and the first optical fiber 111. The isolator 162 may prevent the second laser light 104 from being provided to the first optical fiber 111.

The first wavelength tunable filter 125 may be connected between the first nonlinear optical fiber 124 and the second optical coupler 123. The first wavelength tunable filter 125 may tune and/or adjust the wavelength of the second laser light 104.

The third laser light source 130 may be connected to the first optical fiber 111 of the first laser light source 110. The third laser light source 130 may generate third laser light 106. The third laser light 106 may have a shorter wavelength than the wavelengths of the first laser light 102 and the second laser light 104. According to an example, the third laser light source 130 may include a third optical fiber 131, a third pump light source 132, a third optical coupler 133, a second nonlinear optical fiber 134, and a second wavelength tunable filter 135.

The third optical fiber 131 may be connected to the first optical fiber 111. The third optical fiber 131 may be branched from the first optical fiber 111 and may be connected to a third output terminal 131*a*. The third optical fiber 131 may include a single-mode fiber. The third optical fiber 131 may include an optical fiber doped with a gain medium.

The third pump light source 132 may be connected to the third optical fiber 131. The third pump light source 132 may provide third pump light in the third optical fiber 131 so as to obtain a gain of the third laser light 106. The third pump light may have a wavelength of about 940 nm.

The third optical coupler 133 may be connected to the third optical fiber 131. The third optical coupler 133 may connect the third pump light source 132 to the third optical fiber 131.

The second nonlinear optical fiber 134 may be connected to the third optical fiber 131 between the first optical fiber 111 and the third optical coupler 133. The second nonlinear optical fiber 134 may wavelength disperse the first laser light 102 and generate the third laser light 106. The wavelength of the first laser light 102 may be shortened due to the second nonlinear optical fiber 134. That is, the third laser light 106 may have a shorter wavelength than the wavelength of the first laser light 102.

The isolator 162 may be provided between the second nonlinear optical fiber 134 and the first optical fiber 111. The isolator 162 may prevent the third laser light 106 from being provided to the first optical fiber 111.

The second wavelength tunable filter 135 may be provided between the second nonlinear optical fiber 134 and the third optical coupler 133. The second wavelength tunable filter 135 may tune and/or adjust the wavelength of the third laser light 106.

The optical modulator 200, the PCR chip 300, the sensor 400, and the code generator 500 may be configured in the same manner as illustrated in FIG. 1.

Figure 9:
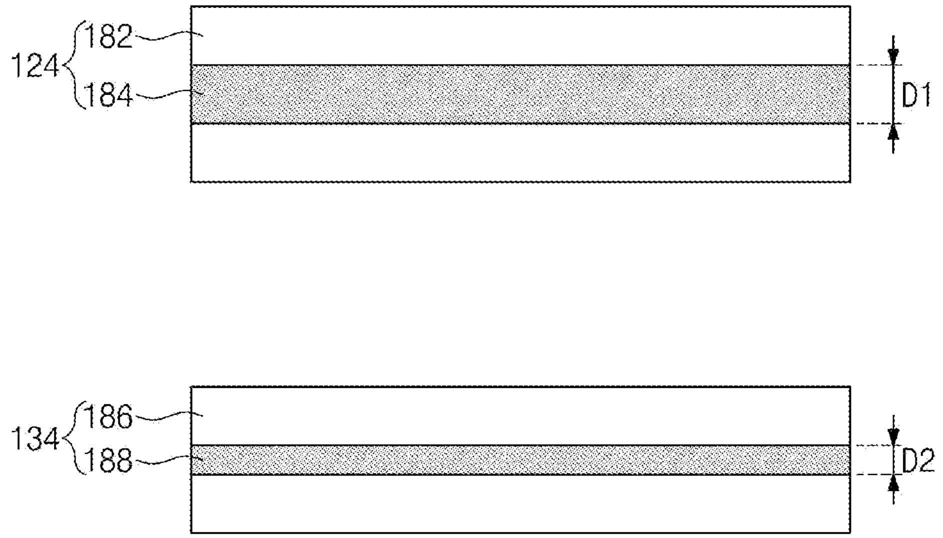
FIG. 9 shows cross-sectional views illustrating examples of the first nonlinear optical fiber and the second nonlinear optical fiber of FIG. 8.

FIG. 9 illustrates examples of the first nonlinear optical fiber 124 and the second nonlinear optical fiber 134 of FIG. 8.

Referring to FIG. 8, a first core 184 of the first nonlinear optical fiber 124 may have a first diameter D1 that is larger than a second diameter D2 of a second core 188 of the second nonlinear optical fiber 134. The first nonlinear optical fiber 124 may generate the second laser light 104 by increasing the wavelength of the first laser light 102 using the first core 184 of the first diameter D1. The second nonlinear optical fiber 134 may generate the third laser light 106 by reducing the wavelength of the first laser light 102 using the second core 188 of the second diameter D2. First cladding 182 of the first nonlinear optical fiber 124 may have the same diameter as that of second cladding 186 of the second nonlinear optical fiber 134.

As described above, the PCR diagnosis apparatus according to an embodiment of the inventive concept may remove and/or minimize noise in fluorescent light using a code generator for switching laser light and fluorescent light through an orthogonal code.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A polymerase chain reaction (PCR) diagnosis apparatus comprising:

a PCR chip configured to store a PCR sample;

a light source part configured to generate collimated light to be provided to the PCR sample;

an optical modulator provided between the light source part and the PCR chip and configured to selectively provide the collimated light to the PCR sample according to a code;

a sensor configured to detect fluorescent light generated in the PCR sample by the collimated light; and a code generator connected between the optical modulator and the sensor and configured to transmit an orthogonal code to the optical modulator and the sensor, wherein the light source part comprises:

a first laser light source configured to generate first laser light; and a second laser light source connected to the first laser light source and configured to generate second laser light having a longer wavelength than a wavelength of the first laser light, and wherein the first laser light source comprises:

a first optical fiber;

a semiconductor saturable absorber mirror connected to one side of the first optical fiber;

a volume Bragg grating provided to another side of the first optical fiber; and a first pump light source connected to the first optical fiber between the volume Bragg grating and the semiconductor saturable absorber mirror and configured to provide first pump light in the first optical fiber.

2. The PCR diagnosis apparatus of claim 1, wherein the second laser light source comprises:

a second optical fiber branched from the first optical fiber; and a second pump light source configured to provide second pump light in the second optical fiber to generate the second laser light.

3. The PCR diagnosis apparatus of claim 2, wherein the second laser light source further comprises:

a first nonlinear optical fiber connected to the second optical fiber and configured to disperse the first laser light; and a first wavelength tunable filter configured to tune the wavelength of the first laser light.

4. The PCR diagnosis apparatus of claim 2, wherein the light source part further comprises a third laser light source connected to the first laser light source and configured to generate third laser light having a shorter wavelength than the wavelength of the first laser light.

5. The PCR diagnosis apparatus of claim 4, wherein the third laser light source comprises:

a third optical fiber branched from the first optical fiber; and a third pump light source configured to provide third pump light in the third optical fiber to generate the third laser light.

6. The PCR diagnosis apparatus of claim 5, wherein the third laser light source further comprises:

a second nonlinear optical fiber connected to the third optical fiber and configured to disperse the first laser light; and a second wavelength tunable filter configured to tune the wavelength of the first laser light.

7. The PCR diagnosis apparatus of claim 6, wherein the first nonlinear optical fiber comprises a first core having a first diameter, and wherein the second nonlinear optical fiber comprises a second core having a second diameter smaller than the first diameter.

8. The PCR diagnosis apparatus of claim 1, wherein the light source part comprises a plurality of laser diodes or light emitting diodes, and further comprises optical fibers between the laser diodes or the light emitting diodes and the optical modulator and an optical fiber coupler between the optical fibers and the optical modulator.

* * * * *